Jan. 5, 1971  B. E. OWENS  3,552,809
LUBRICANT AND DUST SEAL CONFIGURATION
Filed Jan. 29, 1969
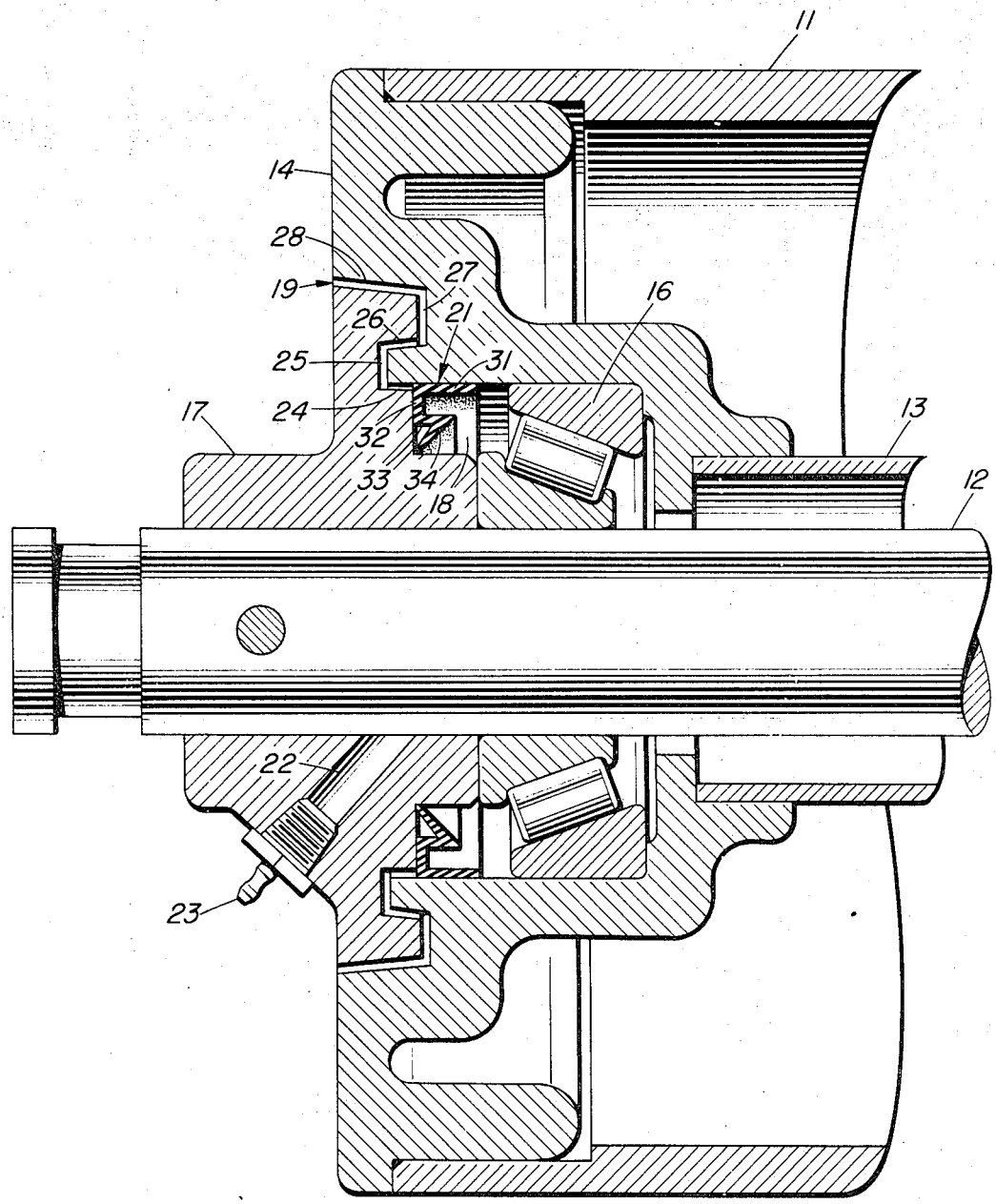
BILLY E. OWENS
INVENTOR
BY  *Lester L Hallacher*
ATTORNEY _United States Patent Office_

3,552,809
Patented Jan. 5, 1971

3,552,809
LUBRICANT AND DUST SEAL CONFIGURATION
Billy E. Owens, Pineville, W. Va., assignor, by mesne assignments, to Owens Manufacturing Inc., a corporation of Delaware
Filed Jan. 29, 1969, Ser. No. 794,922
Int. Cl. F16c 1/24, 33/72
U.S. Cl. 308—36.4      9 Claims

ABSTRACT OF THE DISCLOSURE

A seal for the bearing of a rotating member is described. The seal is designed to greatly inhibit the ingress of foreign matter from without and the egress of lubricant from within. The facing between the rotating and nonrotating members is formed in a labyrinth to substantially increase the length of the path foreign matter must travel before reaching an elastic seal. Action of the seal greatly inhibits the further travel of any foreign matter and also prevents leakage of the lubricating substance. A unique configuration of the labyrinth employs the laws of centrifugal force to further protect against the entrance of foreign matter. The configuration of the elastic seal substantially reduces friction and thereby increases efficiency, reliability, and usefulness of unit containing the inventive seal.

---

The use of seals for rotating members is quite old. Ordinarily, such seals are intended to serve two primary functions. Firstly, they retain the lubricating medium within the bearing area. Thereby greatly facilitating the lubricating function. Secondly, they help prevent the ingress of foreign matter into the bearing area. This function is of primary importance because the existence of such matter in the bearing area reduces the bearing life by as much as seventy percent.

For these reasons many attempts have been made at developing seals which are useful in accomplishing these goals. Some of these attempts have been relatively successful in that they do, to some extent, prevent the undesirable ingress and egress of foreign matter and lubricant. However, even the best attempts have suffered some inherent disadvantages. One disadvantage is the inability to effectively seal the bearing area for long periods of time. This arises because the seals wear rapidly and become ineffective. The obvious result of this is frequent repair, replacement, and costly preventive maintenance. Studies have shown that the rapid wear is occasioned by increased frictional drag. Heretofore attempts at increasing the sealing ability have resulted in increases in frictional drag. The increased frictional drag inherently increases wear and its consequent failures. Consequently, previous attempted improvements have been self defeating. The instant invention successfully seals the bearing area and simultaneously decreases the frictional drag of the seal.

It is therefore an object of this invention to provide a seal which is effective in preventing the ingress of foreign matter into the bearing area.

It is another object to provide a seal which prevents the egress of lubricant from the bearing area.

It is another object to provide such a seal having a labyrinth facing between the rotating and nonrotating members to thereby provide a greatly increased path to entering foreign matter.

It is another object to provide such a device which utilizes centrifugal force to assist in preventing the ingress of foreign matter.

It is another object to provide such a device which substantially reduces frictional drag occasioned by the seal.

The figure shows a preferred embodiment of the invention.

In the figure a cylinder 11 is arranged to rotate about a shaft 12. The shaft is intended to be nonrotatably held in a support structure. A second cylinder 13 is concentrically positioned about shaft 12 within cylinder 11. A closure 14 is positioned between cylinders 11 and 13 and is rigidly attached thereto. A bearing 16, of a type well known in the art, supports end closure 14 and cylinder 13 about the shaft 12. A facing element 17 is positioned about shaft 12 and is rigidly attached thereto. The inner portion of facing element 17 is cut away as indicated by reference numeral 18 to form a lubricant receiving chamber. Facing 17 and closure 14 are formed with congruent noninterferring faces to thereby form a labyrinth 19. A flexible seal 21 is positioned in the lubricant chamber 18. A passage 22 is contained within facing 17. Passage 22 is used to insert the lubricant, such as grease or oil, into chamber 18. A fitting 23 of a type well known in the art permits the insertion of the lubricant while inhibiting its exit from the lubricant chamber 18.

The configuration of labyrinth 19 is important to the inventive concept. The labyrinth includes a first section 24 which is approximately parallel to the axis of shaft 12. A second section 25 is substantially normal to section 24. A third section 26 extends inwardly from section 25 to thereby form a lip on end face 14. Section 26 is angularly positioned with respect to surface 24 such that lines extending sections 24 and 26 will converge at a point located a substantial distance to the left of the end of shaft 12. The angle which section 26 forms with the longitudinal axis of shaft 12 can be between zero and ten degrees. Labyrinth 19 continues upwardly to form a third section 27 which is parallel to section 25. Extending to the left away from section 27 is a fourth section 28 which extends the entire distance between face 17 and end closure 14. Section 28 is also angularly disposed with respect to the axis of shaft 12 such that the axis and the line extending sections 28 will converge to the right of the end of shaft 12. The angle between the axis of shaft 12 and section 28 can vary between one and seven degrees. The width of labyrinth 19, that is the distance between face 14 and facing element 17 is kept to a minimum but is sufficient to prevent interference between the two elements.

In operation a lubricant is injected into chamber 18 through passage 22 and fitting 23. The lubricant will therefore surround bearing 16 and can also be injected into the chamber 29 which exists between shaft 12 and cylinder 13. This lubricant is obviously intended to increase the operational efficiency and life of bearing 16. The pressure of the lubricant against the flexible seal 21 bias the seal outwardly against the inner surfaces of facing 17 and end closure 14. This serves two useful functions; firstly, it prevents the flow of the lubricant outwardly through labyrinth 19 and simultaneously prevents the entrance of dust and other foreign matter through labyrinth 19. The entrance of dust is also greatly inhibited by the configuration of labyrinth 19. The configuration of elastic seal 21 is such that a minimum of the seal contacts the facing element 17 and end closure 14, this greatly reduces the drag of the seal and increases its efficiency.

When the device is in operation cylinders 11 and 13 and end face 14 are rotating about shaft 12. Shaft 12 and facing element 17 remain stationary. Consequently, a centrifugal force is established in labyrinth 19 between closure 14 and facing 17. This centrifugal force is normal to the axis of shaft 12. However, section 28 of labyrinth 19 is angularly disposed with respect to shaft 12. Consequently, the centrifugal force has a component which is parallel to the axis of shaft 12. For this reason any foreign matter attempting to enter the labyrinth 19 will be opposed by this component of the centrifugal force. Also any foreign matter which may enter the labyrinth due to wind or some other cause while the roller is at rest will be expelled by this same component of the centrifugal force. Any foreign particle which does travel the entire length of section 28 and reach sections 26 and 27 will likewise be expelled by the centrifugal force. It is therefore extremely difficult, if not impossible, for any foreign matter to enter the lubricant chamber 18 through labyrinth 19. This is highly desirable because any such matter that enters into said chamber will utimately degrate bearing 16 resulting in its eventual failure. It should also be noted that in the rare event that a foreign particle does travel the entire length of labyrinth 19 its entrance into chamber 18 is inhibited by elastic seal 21.

Although the invention has been described with respect to a particular embodiment thereof, it is not to be so limited as changes and modifications thereof can be made by one skilled in the art within the spirit and scope of the invention as defined by the appended claims.

I claim:

1. In a bearing seal for a rotating member including a shaft, a facing member fixed with respect to said shaft, a closing member rotatably disposed with respect to said shaft, a bearing, and a plurality of cylinders concentrically and rotatably disposed with respect to said shaft, said facing member and said closing member being configured to form a lubricant receiving chamber; an improvement comprising: a discontinuous surface formed on the inner side of facing member; a discontinuous surface formed on the outer side of said closing member, said discontinuous surfaces being congruent to form an interference free labyrinth; the outermost portion of the labyrinth and the longitudinal axis of said shaft forming a first acute angle, the apex of said first acute angle lying inwardly of the outer surface of said closing member, so that forces acting perpendicular to said outermost portion have a component parallel to said axis to thereby inhibit the entrance of foreign matter into said seal.

2. The bearing seal of claim 1 further including an elastic sealing means disposed within said chamber and contiguous with said facing member and said closing member.

3. The bearing seal of claim 1 wherein said labyrinth further includes at least one section substantially normal to the axis of said shaft and at least one section substantially parallel to said axis.

4. The bearing seal of claim 3 wherein said labyrinth further includes a second section acutely disposed with respect to said axis, the apex of said second acute angle lying outwardly of the outer surface of said closing member.

5. The bearing seal of claim 4 wherein said first acute angle is between one and seven degrees.

6. The bearing seal of claim 1 wherein said first acute angle is between one and seven degrees.

7. The bearing seal of claim 2 wherein said labyrinth includes a first innermost section substantially parallel to the axis of said shaft, a second and a fourth section substantially perpendicular to said axis, a third section acutely disposed with respect to said axis, and said outermost section is a fifth section acutely disposed with respect to said axis; said third section being disposed such that a line extending it toward said shaft would cross said shaft outwardly of said bearing seal, said fifth section being disposed such that a line extending it toward said shaft would cross said shaft inwardly of said bearing seal.

8. The bearing seal of claim 7 wherein said fifth section is disposed at an angle of between one and seven degrees with respect to said shaft; and said third section is disposed at an angle of between zero and ten degrees with respect to said shaft.

9. The bearing seal of claim 2 wherein the apex of said first acute angle lies inwardly of said bearing seal.

References Cited

UNITED STATES PATENTS

| 897,189 | 8/1908 | Belluzzo | 277—56 |
| 1,689,735 | 10/1928 | Lösel | 277—56 |
| 1,749,590 | 3/1930 | Krarup | 308—36.1 |
| 1,105,268 | 7/1914 | Gohlke | 277—56 |
| 3,083,972 | 4/1963 | Huddle | 277—56 |
| 3,347,604 | 10/1967 | Lavelle et al. | 308—36.3 |

FOREIGN PATENTS

| 32,351 | 10/1933 | Netherlands | 308—6.1B |

FRED C. MATTERN, Jr., Primary Examiner

W. S. RATLIFF, Jr., Assistant Examiner

U.S. Cl. X.R.

277—56; 308—36.1, 187.1